United States Patent
Wavering

(10) Patent No.: US 8,029,323 B2
(45) Date of Patent: *Oct. 4, 2011

(54) HIGH POWER ELECTRICAL INTERFACE CONNECTION

(75) Inventor: Jeffrey T. Wavering, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/940,066

(22) Filed: Nov. 5, 2010

(65) Prior Publication Data

US 2011/0053435 A1    Mar. 3, 2011

Related U.S. Application Data

(62) Division of application No. 12/535,938, filed on Aug. 5, 2009, now Pat. No. 7,857,669.

(51) Int. Cl.
*H01R 13/24* (2006.01)
(52) U.S. Cl. ........................... 439/700; 439/246
(58) Field of Classification Search .................. 439/246, 439/247, 248, 252, 378, 660, 700, 824, 843
See application file for complete search history.

(56) References Cited

U.S. PATENT DOCUMENTS

| | | | |
|---|---|---|---|
| 2,742,626 A * | 4/1956 | Collins et al. | 439/363 |
| 3,378,810 A * | 4/1968 | Dorrell | 439/436 |
| 4,152,086 A | 5/1979 | Achenbach et al. | |
| 4,993,975 A | 2/1991 | Asick et al. | |
| 5,191,248 A | 3/1993 | Huss | |
| 5,276,587 A | 1/1994 | Ciaccio | |
| 5,378,161 A | 1/1995 | Loder | |
| 5,425,649 A | 6/1995 | Reymond | |
| 6,036,508 A | 3/2000 | Anderson et al. | |
| 6,491,543 B1 | 12/2002 | Yatskov | |
| 6,638,117 B2 | 10/2003 | Murakami et al. | |
| 6,672,773 B1 | 1/2004 | Glenn et al. | |
| 7,044,795 B2 | 5/2006 | Diep | |

FOREIGN PATENT DOCUMENTS

GB    2243034 A    * 10/1991

* cited by examiner

*Primary Examiner* — Khiem Nguyen

(74) *Attorney, Agent, or Firm* — Carlson, Gaskey & Olds, PC

(57) ABSTRACT

An electrical connection includes a socket having a bore and a pin. The pin is allowed to move along an axis defined inwardly into the socket bore, and also to move radially relative to the axis. The socket bore has a generally conical portion. The pin has a generally conical face. The generally conical face of the pin is in contact with the generally conical portion of the socket. A motor system including such a connection is also disclosed. In another feature, an electrical connection includes a socket having a bore and a pin. The pin is allowed to move along an axis defined inwardly into the bore, and also to move radially relative to the axis. The pin is spring-biased into the bore such that an end of the pin seats on an end face of the bore.

12 Claims, 2 Drawing Sheets

HIGH POWER ELECTRICAL INTERFACE CONNECTION

RELATED APPLICATION

This application is a divisional of U.S. patent application Ser. No. 12/535,938, which was filed Aug. 5, 2009, now U.S. Pat. No. 7,857,669.

BACKGROUND OF THE INVENTION

This application relates to a floating electrical connector which can be utilized for high power connections.

Electrical components are utilized in more and more applications. As the sophistication of these components increase, complex motor controllers are needed. Very large, high power motor controllers are mounted in groups, and receive a connector to receive power, and a connection to supply power to a motor. One type of connection is a "rack and plug-in approach". Such connections raise challenges, as they are large, and the plug-in must be blindly inserted. The connectors in these large connections are referred to as blind mates.

Due to tolerances, it is not possible for the connectors to be identically positioned. Thus, one connector is often allowed to float for alignment. The use of a floating connector and the blind mating does not allow for any secure connection to be made to tie the two connectors mechanically.

In applications which may be subject to vibration, micro or differential movement may occur between the two connector halves. This micro movement can result in fretting or accelerated wear. At very high currents, such as hundreds of amps, the wear can be problematic.

SUMMARY OF THE INVENTION

An electrical connection includes a socket having a bore and a pin. The pin is allowed to move along an axis defined inwardly into the socket bore, and also to move radially relative to the axis. The socket bore has a generally conical portion at the base of the socket. The pin has a generally conical face. The generally conical face of the pin is in contact with the generally conical portion of the socket. A motor system including such a connection is also disclosed.

In another feature, an electrical connection includes a socket having a bore and a pin. The pin is allowed to move along an axis defined inwardly into the bore, and also to move radially relative to the axis. The pin is spring-biased into the bore such that an end of the pin seats on an end face of the bore.

These and other features of the present invention can be best understood from the following specification and drawings, the following of which is a brief description.

DETAILED DESCRIPTION OF THE PREFERRED EMBODIMENT

Figure 1A:
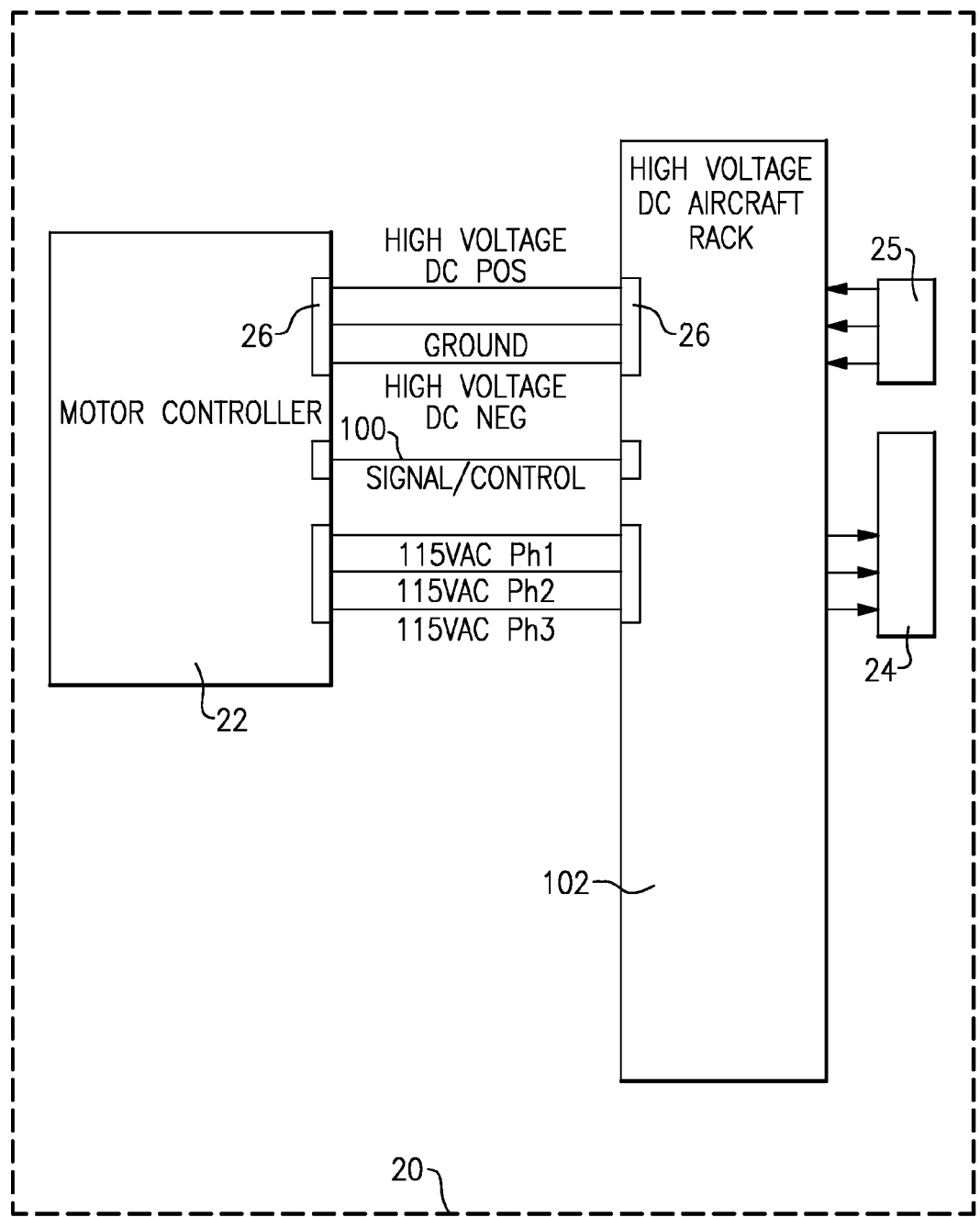
FIG. 1A is a schematic view of a motor controller connected to a motor.

FIG. 1A schematically shows an aircraft 20 which may include motor controllers 22 for supplying high power to a motor 24. In practice, the aircraft 20 may include a plurality of such motor controllers and associated motors. Plural electrical connections 26 electrically connect the motor controllers 22 to motors 24. As can be appreciated from FIG. 1, there is a power supply 25 for supplying DC power to the motor controller 22, and through electric connections 26. As known, there is a positive line, a negative line, and a ground line included. At least the positive and negative lines may include a connection 26 as described below. There may also be a signal control line 100 connecting the two. As shown, there may also be a power supply line leading from the motor controller 22, back to a motor 24. Again, there may be three lines, for the three phases of power. Each of these lines pass through what is known as a rack 102. The rack 102 receives the power supply lines, and communicates the power back to the motor 24.

Figure 1B:
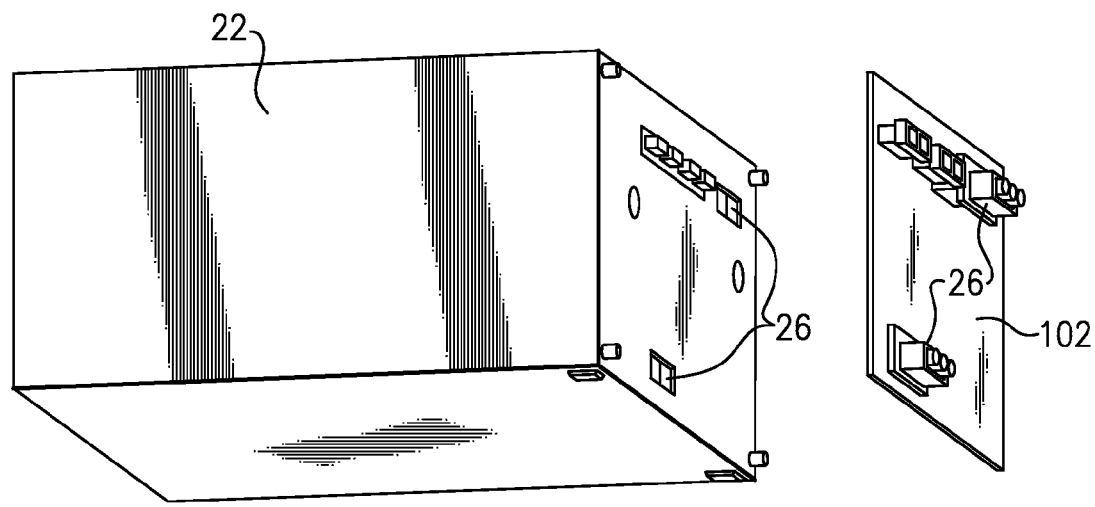
FIG. 1B shows a drawing of a motor controller and a plurality of electric connections.

As can be appreciated from FIG. 1B, the rack 102 may have a small panel which actually includes the electric connections 26. Typically, these connections are for the blind mating, as the motor controller 22 has been mounted into the rack which may mount a plurality of motor controllers. As the controller 22 mounts onto the panel 102, electrical connections are made. Typical electrical connectors 26 on motor controllers are fixed in position and location and electrical connectors 26 on rack and panels 102 are floating or moving in position and location for tolerance management. As shown in FIG. 1B, the portions of the electric connections 26 illustrated are generally rectangular. However, this may simply be the outside housing shape, and the actual connection portions will be as shown in FIG. 2, and generally cylindrical.

Figure 2:
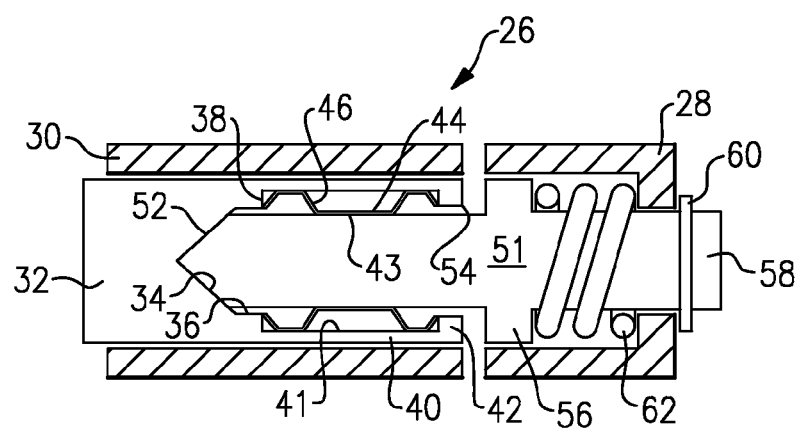
FIG. 2 is a cross-sectional view through an electrical connection according to this invention.

FIG. 2 shows a disclosed connection 26. In the disclosed connection 26, a pin insulation body 28 is associated with a socket insulation body 30. The socket insulation body 30 includes a socket conductor 32 which forms one of the electrical connection halves. The socket 32 has an internal generally conical bore 34. The conical bore 34 merges into an inner cylindrical bore 36. Beyond the inner cylindrical bore 36 is an extending outer cylindrical bore 41, formed by body portion 40. An inner ledge 38 merges bore 36 into bore 41. An outer ledge 42 defines the end of outer cylindrical bore 41. As can be seen, bore 41 has a greater internal diameter than bore 36.

A spring 44 may be formed of a conduction foil, such as beryllium copper foil. The spring 44 is formed to have a valley 43 intermediate outer ridges 46. The outer ridges 46 contact the cylindrical bore 41, while the valley 43 contacts an outer periphery of a pin 51. Pin 51 has a forward conical portion 52 which, when seated in the bore, abuts the conical portion 34. The pin 51 has a head 56, and an outer end 58. The outer end extends outwardly of the insulation body 28. A retention ring 60 stops the end 58 from moving into the housing 28. A spring 62 biases against the head 56, and forces the pin 51 into the position illustrated in FIG. 2, wherein the conical portion 52 of the pin abuts the conical bore 34 of the connector 32.

Should there be misalignment, the pin 51 can float relative to the socket 32 and body 30 to ensure proper alignment. Radial float of pin 51 is achieved by a floating feature on connector body 28 As can be appreciated from FIG. 2, the pin is allowed to move axially into and out of the bore of the socket. On the other hand, the spring bias forcing the conical portion 52 and 34 together ensures that there will be good connection at all times, and even during vibration.

In a sense, the pin is spring-biased such that its conical surface bottoms out, or seats, onto the conical surface of the socket conductor 32. While conical contact surfaces are shown, other shapes may be utilized, as long as the pin does bottom out against the surface of the socket. With this arrangement, the combination of the pin and socket form an effective beam shape.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An electrical connection comprising:
a socket having a bore;
a pin, said pin being allowed to move along an axis defined inwardly into said socket bore, and also to move radially relative to said axis, said socket bore having a generally conical portion, and said pin having a generally conical face, said generally conical face of said pin being in contact with said generally conical portion of said socket;
a first spring biasing said pin into said socket; and
a second spring contacting an inner wall of said socket, and an outer peripheral surface of said pin.

2. The electrical connection as set forth in claim 1, wherein said socket bore includes an inner cylindrical bore positioned axially outwardly of said generally conical portion.

3. The electrical connection as set forth in claim 2, wherein said socket bore also includes an outer cylindrical bore which extends from said inner cylindrical bore of said socket, said outer cylindrical bore defining an inner diameter which is greater than an inner diameter at said inner cylindrical bore, and there being a ledge portion extending radially inwardly from said outer cylindrical bore at an axially outer end of said socket.

4. An electrical connection comprising:
a socket having a bore;
a pin, said pin being allowed to move along an axis defined inwardly into said socket bore, and also to move radially relative to said axis, said socket bore having a generally conical portion, and said pin having a generally conical face, said generally conical face of said pin being in contact with said generally conical portion of said socket;
a first spring biasing said pin into said socket;
said socket bore includes an inner cylindrical bore positioned axially outwardly of said generally conical portion;
said socket bore also includes an outer cylindrical bore which extends from said inner cylindrical bore of said socket, said outer cylindrical bore defining an inner diameter which is greater than an inner diameter at said inner cylindrical bore, and there being a ledge portion extending radially inwardly from said outer cylindrical bore at an axially outer end of said socket; and
a second spring being positioned within said outer cylindrical bore, said second spring contacting both an inner wall of said socket along said outer cylindrical bore, and an outer peripheral surface of said pin.

5. The electrical connection as set forth in claim 1, wherein said pin is movable radially with a pin insulation body, and said first spring is positioned within said pin insulation body.

6. An electrical connection comprising:
a socket having a bore;
a pin, said pin being allowed to move along an axis defined inwardly into said socket bore, and also to move radially relative to said axis, said socket bore having an end face, and said pin having an end face, and a spring biasing said spring into said socket such that said end face of said pin bottoms out against said end face of said socket; and
said pin extends axially beyond a pin insulation body in an opposed direction from said socket, further having a retainer to prevent said pin from being driven fully into said pin insulation body by said first spring.

7. The electrical connection as set forth in claim 1, wherein said second spring is formed by a foil element having valleys and intermediate outer ridges, with the intermediate outer ridges contacting the socket bore, and the valleys contacting the pin.

8. The electrical connection as set forth in claim 3, wherein said second spring is formed by a foil element having valleys and intermediate outer ridges, with the intermediate outer ridges contacting the socket bore at the outer cylindrical bore, and the valleys contacting the pin.

9. The electrical connection as set forth in claim 6, wherein said socket bore includes an inner cylindrical bore positioned axially outwardly of said generally conical portion.

10. The electrical connection as set forth in claim 9, wherein said socket bore also includes an outer cylindrical bore which extends from said inner cylindrical bore of said socket, said outer cylindrical bore defining an inner diameter which is greater than an inner diameter at said inner cylindrical bore, and there being a ledge portion extending radially inwardly from said outer cylindrical bore at an axially outer end of said socket.

11. The electrical connection as set forth in claim 10, wherein a second spring is positioned within said outer cylindrical bore, said second spring contacting both an inner wall of said socket along said outer cylindrical bore, and an outer peripheral surface of said pin.

12. The electrical connection as set forth in claim 10, wherein said second spring is formed by a foil element having valleys and intermediate outer ridges, with the intermediate outer ridges contacting the socket bore at the outer cylindrical bore, and the valleys contacting the pin.

* * * * *